US007007299B2

(12) United States Patent
Ioele et al.

(10) Patent No.: US 7,007,299 B2
(45) Date of Patent: Feb. 28, 2006

(54) METHOD AND SYSTEM FOR INTERNET HOSTING AND SECURITY

(75) Inventors: Anthony Ioele, Glen Mills, PA (US); Mark Clancy, Herndon, VA (US); Gerald M. Samchuck, Roanoke, VA (US); Syed Hasan Jafri, Herndon, VA (US); Howard Morgasen, Plainview, NY (US)

(73) Assignee: Citibank, N.A., New York, NY (US)

( * ) Notice: Subject to any disclaimer, the term of this patent is extended or adjusted under 35 U.S.C. 154(b) by 641 days.

(21) Appl. No.: 09/941,553

(22) Filed: Aug. 30, 2001

(65) Prior Publication Data

US 2002/0073337 A1 Jun. 13, 2002

Related U.S. Application Data

(60) Provisional application No. 60/228,923, filed on Aug. 30, 2000.

(51) Int. Cl.
*G06F 17/00* (2006.01)

(52) U.S. Cl. ............................ 726/14; 726/23; 726/11

(58) Field of Classification Search ........ 713/200–202, 713/100–154; 709/238, 243; 714/4; 726/1–36
See application file for complete search history.

(56) References Cited

U.S. PATENT DOCUMENTS

| | | | | |
|---|---|---|---|---|
| 5,859,959 | A * | 1/1999 | Kimball et al. | 714/4 |
| 5,926,463 | A | 7/1999 | Ahearn et al. | |
| 6,101,555 | A | 8/2000 | Goshey et al. | |
| 6,324,656 | B1 | 11/2001 | Gleichauf et al. | |
| 6,578,147 | B1 * | 6/2003 | Shanklin et al. | 713/200 |
| 6,606,708 | B1 * | 8/2003 | Devine et al. | 713/201 |
| 6,754,716 | B1 * | 6/2004 | Sharma et al. | 709/238 |

OTHER PUBLICATIONS

Terry Escamilla, “Intrusion Detection”, 1998, John Wiley & Sons, Inc., pp. 174, 192, 194, 196, 197, 202, 203, 206, 207.*

Http://www.faqs.org/rfcs1918.html.*

Http://www.stanford.edu/group/networking/lnaguide/docs/nat.html.*

Http://www.cert.org/security-improvement/practices/p063.html.*

Norman Michael Wright, PCT International Search Report, Jan. 10, 2002.

Preliminary Examination Report for Application No. PCT/US01/26825, dated Jul. 9, 2002 (mailing date).

* cited by examiner

*Primary Examiner*—David Jung
(74) *Attorney, Agent, or Firm*—George T. Marcou; Kilpatrick Stockton LLP

(57) ABSTRACT

The present invention relates to a system and method for providing security to Internet hosting sites and mitigating electronic attacks against such sites. The system and method of the present invention provide: adequate Internet connections to the site to prevent connection floodings from intruders; implementation of different types of firewalls and an intrusion detection system to monitor and guard the site from electronic attacks; routing protocols to limit access to Internet hosting sites; continuous transfer of a hosting site from one geographic location to another in the event of an electronic attack against the hosting site or a disaster situation.

19 Claims, 6 Drawing Sheets

METHOD AND SYSTEM FOR INTERNET HOSTING AND SECURITY

This application claims the benefit of U.S. Provisional Application No. 60/228,923 titled "METHOD AND SYSTEM FOR INTERNET HOSTING AND SECURITY," filed Aug. 30, 2000, which is herein incorporated by reference in its entirety.

BACKGROUND OF THE INVENTION

1. Field of the Invention

The present invention relates to the field of Internet hosting and security, and more particularly, to a method and system for providing security to hosting sites on a data network such as the Internet and mitigating electronic attacks against such sites.

2. Description of the Related Art

The proliferation of the Internet and its multimedia interface, the World Wide Web, opens up a new channel for commerce and information. Individuals and businesses are racing in waves to the Internet to access information or establish electronic commerce (e-commerce) sites in order to tap into this newfound channel. Individuals who desire to get onto the Internet to access information include those who desire to obtain information that they are not privy to retrieve. Thus, the desire of a business to set up its own e-commerce site also comes with a desire to secure such site from unwanted intruders. Unlike the traditional brick-and-mortar shop, which merely requires physical security to prevent intrusion, an e-commerce site requires both physical security and electronic security to do the same. Physical security is required to protect and house the hardware and software components needed to host the e-commerce site. Additionally, because the e-commerce site is open to the public through an electronic medium such as the Internet, electronic security is also needed to prevent intruders from electronically tampering with the software components and confidential information residing in the hardware components.

The conventional scheme to provide electronic security is to set up a firewall between the e-commerce or Internet hosting site and the Internet to prevent intruders from accessing file and application servers supporting the hosting site. The firewall also protects an intranet or a private network from the outside world. However, setting up a firewall is such a complicated task that, if not done properly, may provide intruders with opportunities to attack and penetrate the firewall. For instance, a firewall may be attacked based on an application bug inherent in the firewall. It may also be penetrated via a compromise in access security to the firewall. The firewall may also be exploited through any misconfigurations by the firewall administrator. Additionally, a firewall is susceptible to and cannot withstand connection floodings often used by intruders in their desire to gain illegitimate access to the site or cripple the site with denial-of-service attacks.

BRIEF SUMMARY OF THE INVENTION

There exists a need for a method and system for providing electronic security to Internet hosting sites. There also exists a need for a method and system for monitoring electronic attacks by outside intruders against Internet hosting sites and competently repulsing such attacks to preserve the integrity of the sites.

Accordingly, the preferred embodiments of the present invention provide a method and system for mitigating the risk of denial-of-service attacks against an Internet hosting site by providing adequate Internet connections to the site to prevent connection floodings from intruders.

The preferred embodiments of the present invention also provide a method and system for implementing different types of firewalls and firewall monitoring protocols at an Internet hosting site to deter electronic attacks against such site.

The preferred embodiments of the present invention also provide a method and system for intrusion detection at an Internet hosting site to monitor and guard the site from denial-of-service attacks and illegal accesses.

The preferred embodiments of the present invention also provide a method and system for aggregating requests to a plurality of Internet hosting sites, load balancing a defined set of firewalls with the requests, and shutting down any firewall that is detected with an inherent weakness against electronic attacks.

The preferred embodiments of the present invention also provide a method and system for transferring an individual Internet hosting site to a different geographic location once a denial-of-service attack against the site is detected at its current geographic location.

The preferred embodiments of the present invention also provide a method and process for implementing and managing a secure Internet hosting site.

Additional aspects and novel features of the invention will be set forth in part in the description that follows, and in part will become more apparent to those skilled in the art upon examination of the present disclosure.

BRIEF DESCRIPTION OF THE DRAWINGS

The preferred embodiments are illustrated by way of example and not limited in the following figures, in which.

DETAILED DESCRIPTION OF THE INVENTION

Reference is now made in detail to an embodiment of the present invention, an illustrative example of which is illustrated in the accompanying attachments, showing a method and system for Internet hosting and security. The present invention addresses the vulnerability of web sites in general and e-commerce sites in particular to denial-of-service attacks, wherein the method and system for Internet hosting and security of the present invention are implemented from a hosting standpoint to mitigate the risk of such attacks.

According to a preferred embodiment of the present invention, the host application system of a host web site, such as a commercial or e-commerce site, has security measures in place to prevent unauthorized access to the host application network of servers and devices. These measures include a combination of hardware and software security and limited access rights. A host application Information Security Administrator (ISA) oversees system activities and all host security measures relating to application servers database servers and other components at the hosting site relating to informational data. Any proposed changes to the network environment at the host data center that could potentially have an impact on the host application system must be approved by the ISA. In the present invention, a host refers to a business or any other entity that sets up the web site and host application system.

Figure 1:
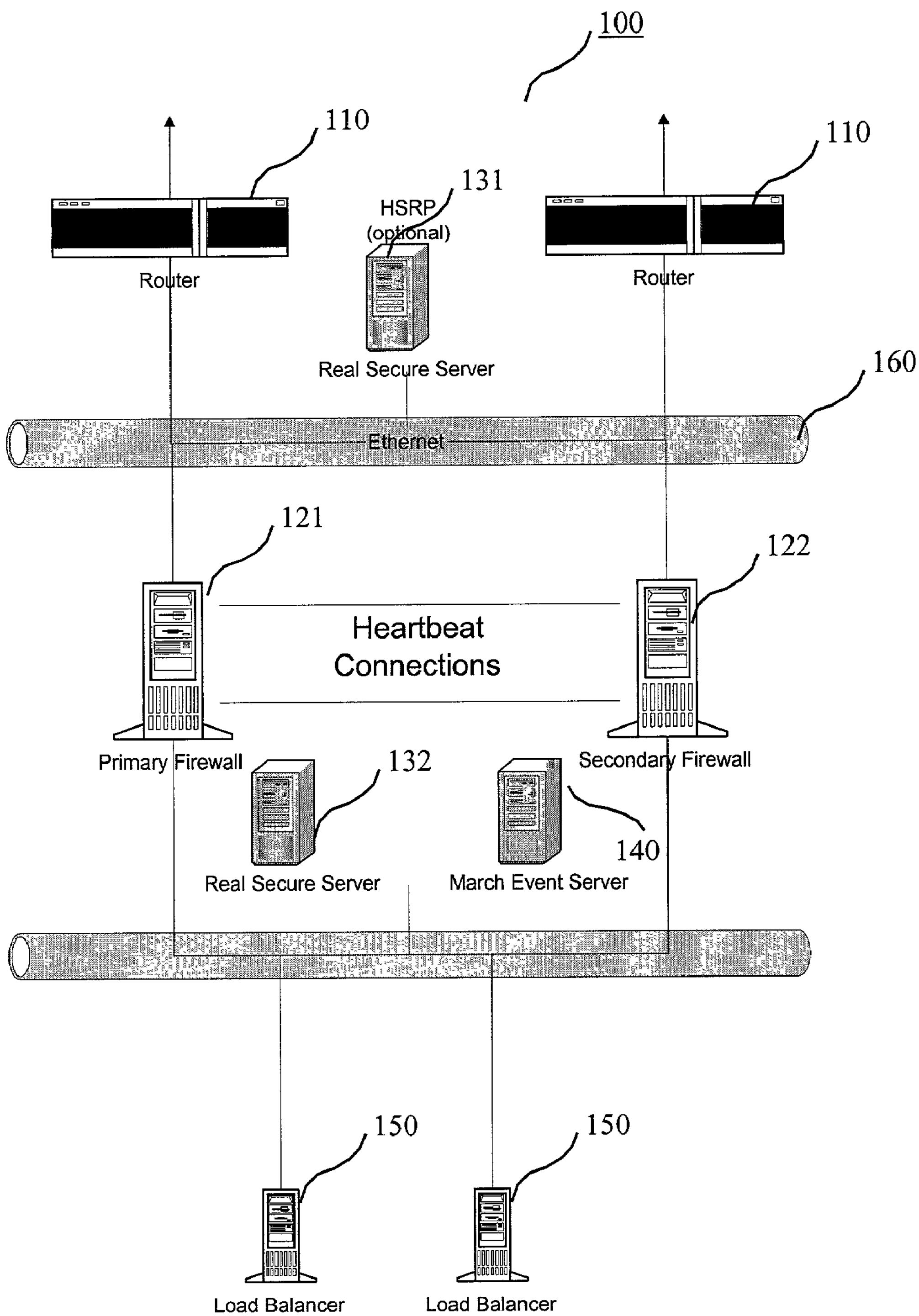
FIG. 1 depicts network security measures for an Internet hosting site in accordance with an embodiment of the present invention.

The core of the security infrastructure for Internet hosting of a web site (Internet hosting site) lies in the combinational use of network routers, network switches, firewalls, and load balancing technology to thwart electronic attacks against Internet hosting sites. The Internet connections to each site are also sufficiently large to prevent flooding attacks. According to an embodiment of the present invention, the size of the Internet connections is based on the load, i.e., the number of users that will be connected to each site at once, with the size based on ten to fifty times the actual or estimated load. For example, the size of the Internet connections can be at 100 Mbps. FIG. 1 depicts the network security measures for an Internet hosting site 100. The first level of this security comprises routers 110, such as a pair of CISCO 7200 Routers, that limit external access to the network by the type of Internet traffic. The second level of security is maintained by a plurality of firewalls 121 and 122, such as Cyberguard Firewalls, with one as primary and the other as backup. The firewalls 121 and 122 communicate with each other via an interconnection 160, such as an Ethernet or fiber-optic connection. Also included in the second level is intrusion detection software implemented in workstations or servers 131 and 132, such as Real Secure intrusion detection software, placed before and after the firewalls 121 and 122. Another level of security is maintained by an operations and event log management system 140, such as Tivoli, which monitors for indication of software, hardware, network and security problems, and other event logs. The load balancers 150 are used for load balancing application servers at the Internet hosting site. A plurality of application servers with duplicate applications may be used at the Internet hosting site to increase the load capability of the site by allowing more users to access the site. The load balancers 150, with one acting as a primary and the other a secondary or backup, are then used to evenly distribute user requests and processing across all the application servers at the site. A load balancing protocol may be used for communication between the firewalls and the load balancer to monitor peer state and functionality. It is also used to coordinate a manually activated switchover ordered from the operator at a management workstation/console or an automatically activated switchover when a device fails or is placed out of service by the management console.

According to an embodiment of the present invention, the routers, switches, and firewalls are preferably based on CISCO™ technology, wherein the firewall technology may be assembled from multiple vendors with load balancing capability. The load balancing technology is preferably based on F5™ network technology. Most denial-of-service attacks go after or attempt to go after one or two different firewall manufacturers. Hence, the ability to mix firewalls with load balancing capability from different brands and manufacturers enhances the defense of an Internet hosting site against the attacks. This is achieved by shutting down any firewall that is subject to attacks and diverting site requests to other firewalls and onto the Internet hosting site. As a result, the site can actually prevent denial-of-service attacks or rapidly re-provision firewall traffic in the event of a weakness within the underlying firewall systems.

As shown by the Real Secure servers 131 and 132, an intricate intrusion detection scheme is also set up at the Internet hosting site to monitor attacks against the Internet hosting site. The intrusion detection scheme provides back tracing of addresses from which the attacks originate in order to counter them. According to an embodiment of the present invention, the intrusion detection scheme incorporates the use of conventional and commercially available hardware/software tools for tracing the Internet protocol (IP) addresses of the attacks and blocking incoming requests and/or attacks from such addresses. Additionally, through operational procedures, when a denial-of-service attack against an Internet hosting site in a geographical area is detected, the web site can be moved almost instantaneously to a different geographical location to avoid the attack. These procedures make use of load balancers for the various Internet hosting sites that will be further discussed later. On the processing side, any application that will be hosted on the Internet hosting site must go through a defined set of processes to ensure its security. The processes, which will be further described later as the Change Control processes, take into account the application operational readiness and its Internet integrity that includes security and auditability.

The manner in which an Internet hosting site processes requests and at the same time monitors and mitigates electronic attacks is now described with reference to FIG. 1. First, Internet hosting sites (e.g., informational and/or commerce web sites) have their Internet connections aggregated together. Any user requests coming from the Internet to any of the hosted sites must first go through this aggregated bandwidth to a main set of network routers 110, which functions as the first level of network security. The routers 110 screen the requests to limit external access to the network of hosted sites by the type of Internet traffic. Although FIG. 1 only shows a network security scheme for a single Internet hosting site, it should be understood from the present disclosure that multiple Internet hosting sites can have their Internet connections aggregated together, with each site having components 121, 122, 131, 132, 140, and 150 function in similar manner; wherein the firewalls 121, 122 of each Internet hosting site are connected to the same routers 110. Thus, the routers 110 are also used to direct approved Internet traffic to the particular Internet hosting site(s) requested by such traffic.

The routers 110 operate on a "deny all unless explicitly defined" basis with access control lists (ACLs) for regulating authorized and unauthorized traffic. A host Network Security Administrator (NSA) is assigned to analyze router dumps on a daily basis to assure nothing has been changed. The host NSA oversees network activities and all host security measures relating to the network such as routers, switches, and VLANs. If unauthorized changes are identified, the NSA will immediately roll back the router software to the approved version prior to the modification. Passwords on the routers 110 and Ethernet switches 160 will be maintained by the NSA and a copy will be maintained in a vault, accessible only by the ISA. The Ethernet switches 160 provide connections between the firewalls 121, 122, and they are located in a demilitarized zone (DMZ) that acts as a buffer between the routers 110 and the firewalls 121, 122. Any change to the ACLs in the routers 110 must follow the Change Control processes to be described later. All requests for access to the routers 110 are sent to the ISA for approval. The NSA implements all approved requests. Copies of the routers' ACLs are backed up, encrypted, and stored off-site, accessible only by the ISA and NSA.

After the screening, the routers 110 direct the user requests to a firewall system to a particular Internet hosting site for each type of Internet application traffic. For instance, a single firewall system may have one or more firewalls dedicated to serving a particular service such as HTTP. The firewall system at each site functions as the second level of network security. It is intended to prevent unauthorized commands or source addresses for entry and exit. As mentioned earlier, there may be a plurality of Internet hosting sites with their Internet connections aggregated together. Furthermore, some of those sites may be duplicate sites to accommodate additional user access to a web site. As with the duplicate application servers at an Internet hosting site, the duplicate Internet hosting sites may include firewall load balancers (not shown) that are used to evenly distribute user requests and processing across all the duplicate Internet hosting sites via their firewall systems. The virtual IP address of each host application residing in an application server at the Internet hosting site is used for all communication. The firewall load balancers maintains the virtual IP address. Each firewall load balancer routes traffic to the various available firewalls based on the maintained virtual IP address and maintains the state information for the user sessions.

The firewalls within the firewall system of each Internet hosting site allows fail-over detection and switchover when failed services are detected from one firewall to another. According to an embodiment of the present invention, the firewall gateway environment of the firewall system is built without a single point of failure and the peer-to-peer architecture eliminates the need for manual intervention of the stand-by firewall gateway. As mentioned earlier, FIG. 1 shows an example of a single Internet hosting site 100; thus, only a single firewall system is shown. However, explanation for the firewall system 121, 122 applies to firewall systems of other Internet hosting sites that may be aggregated with site 100. Likewise, any explanation in the present invention with regard to the other components 131, 132, 140, and 150 of the site 100 also applies to corresponding components of other Internet hosting sites that may be aggregated with the site 100.

According to an embodiment of the present invention, each firewall system may comprise two equivalent firewalls 121, 122 physically co-located and on the same network segment, with crossover connections between the firewalls to provide dedicated communication channels between the firewalls. For instance, the crossover connections can be two crossover Ethernet cables (or equivalent) carrying a "heartbeat" communication protocol, made possible by the Ethernet connection 160, between the two firewalls to monitor peer state and functionality. The "heartbeat" protocol is also used to coordinate a manually activated switchover ordered from the management workstation or console of the NSA/ISA or an automatically activated switchover when a device fails or is placed out of service by the management console.

One firewall 121 is configured as the primary and the other 122 is configured as the secondary, or backup. The primary firewall's IP address is used for all communication. In the event of a primary firewall failure, the secondary firewall will assume the IP address (IP impersonation) of the failed firewall and continue handling all traffic. According to an embodiment of the present invention, fail-over can take place in less than one minute without rebooting. The secondary (backup) firewall server 122 has two methods of detecting failures in the primary 121. Fail-over will occur when a failure is detected via the "heartbeat" connections or the operator (e.g., ISA-"Host Applications" or NSA-"Network Devices") initiates a manual fail-over. According to another embodiment of the present invention, firewalls within a firewall system of an Internet hosting site share the same logical rule base, but may be comprised of different vendor devices. As mentioned earlier, because most denial-of-service attacks go after only one or two different firewall manufacturers, the ability to mix firewalls of different vendors greatly enhances the chance of preventing such attacks. All configuration information is synchronized on each firewall via software, so all firewalls are functionally identical when a fail-over occurs.

As mentioned earlier, the virtual IP address of each host application residing in an application server at an Internet host site is used for all communication. Thus, all external (e.g., Internet) Secured Socket Layer (SSL) connections are made to the firewall, which is configured to proxy for a single internal virtual IP address of the host application (whose application server the firewall protects), which could be a virtual address of an application level load balancer (when there are duplicate application servers at an Internet hosting site, as mentioned earlier). The NSA monitors the firewall manager server and take appropriate actions for all alarms. The NSA is the only person that has access rights to these servers, unless the ISA also approves access by others to the firewall servers.

Also included in the second level of network security are intrusion detectors 131, 132 located before and after the firewalls 121, 122. The intrusion detectors perform many functions as mentioned earlier, including: automatically monitoring network traffic, providing alerts when attack signatures are detected, and additionally guarding against internal abuse. Any suspected or possible intrusion into an Internet hosting site are identified as a security incident. Types of security incidents include, for example, loss of confidentiality, destruction of data, loss of system integrity, system degradation or denial of service, loss of data integrity, and unauthorized use of corporation resources. The intrusion detectors may be in the form of, for example, servers with intrusion detection software or network based event collection engines. They gather different data relating to the originating points of the requests. There may be assigned personnel to monitor the intrusion detectors and analyze host logs to determine if an attack was successful. For instance, the intrusion detectors may comprise Real Secure Engines that run on a dedicated host and monitor network traffic for attack signatures and alert a Real Secure Manager when an attack is detected. This is accomplished by having a Real Secure Agent analyzing host logs from the Real Secure Engines to determine whether an attack was successful and then reporting to the Real Secure Manager. One of the NSA's job is to monitor the Real Secure Monitor and take appropriate actions for all alarms. Again, the NSA is the only person that has access rights to the intrusion detection servers unless the ISA approves others for access to these servers. Like the firewalls, the detectors 131, 132 also have their own set of built-in triggers and filters.

Figure 2:
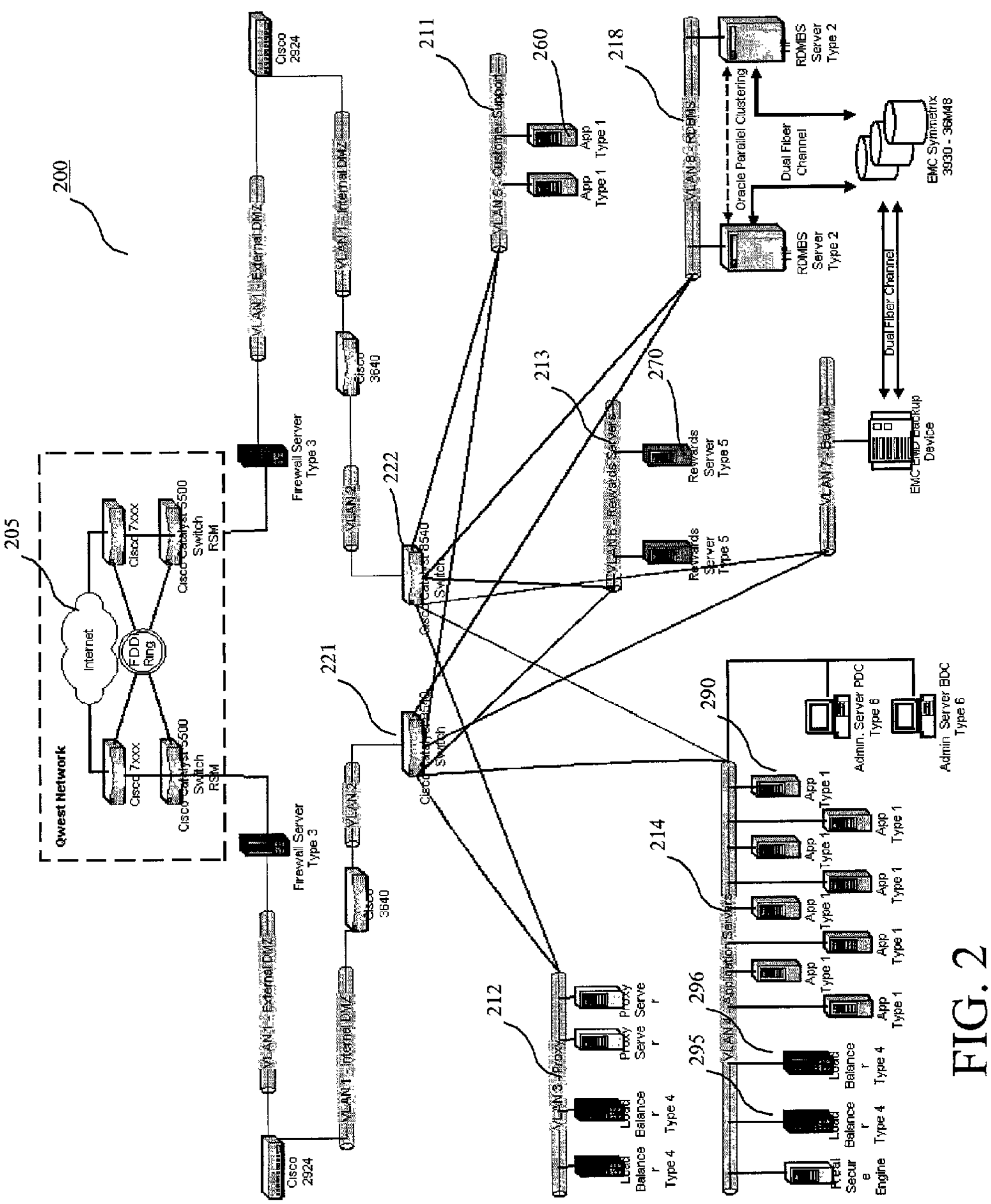
FIG. 2 depicts an example of a host application system with one level of security having Access Control Lists in accordance with an embodiment of the present invention.

A third level of security is maintained by enforcing Access Control Lists (ACLs) within the internal virtual local area networks (VLANs). According to an embodiment of the present invention, an Internet hosting site will have multiple VLANs assigned to its system. FIG. 2 shows an example of such a host application system 200 for an Internet hosting site. The hosted application, such as a business application, may be made up of components that reside on separate VLANs (e.g., 211, 213, 214, 218). Access to the host applications residing in the application servers 290 and to other servers (e.g., 260 and 270) of the host system 200 is requested through the Internet 205. As shown in FIG. 2, there are various VLANs, each performing the local networking of a group of related servers. For instance, a VLAN 211 is used for the local networking of various application servers 260 for customer support of the host web site, a VLAN 212 is used for the local networking of various proxy servers, a VLAN 213 is used for the local networking of servers 270 that handle "reward" applications, and VLAN 214 is used for the local networking of various other application servers. A plurality of switches 221 and 222 are used to direct external access requests to the various VLANs and their respective application servers. From the present disclosure, the layout and various connections depicted in FIG. 2 are self explanatory to one skilled in the art.

According to an embodiment of the present invention, only the traffic that is explicitly allowed by a particular VLAN is permitted either by a location address of the particular VLAN, i.e., either by port, IP address, or both for that particular VLAN. For example, a VLAN that supports the Web server traffic will have HTTP and HTTPS ports allowed into that VLAN. The Web server VLAN may also allow SQLNET traffic to a second VLAN for the database server. However, the database server VLAN may only allow SQLNET traffic from the web server VLAN. The internal routing in the aggregate switches 221 and 222 (one primary, one secondary/backup) will block all other traffic that does not comply with ACLs maintained by the switches 221, 222. In high security applications, the VLAN routing by the switch can be replaced by a firewall that can act as the router between the VLANs. Thus, another level of security is added.

A fourth level of security is maintained by an operations and event log management system 140 as shown in FIG. 1, which monitors for indication of software, hardware, network and security problems, and other event logs. For instance a Tivoli TEC engine may be used for event log management. The Tivoli TEC engine is run on its own server and is used to roll up and monitor all event logs in the Internet hosting site. This allows the NSA of the Internet hosting site to catch any security issue or other areas of concern that may arise. Tivoli ensures the continuity of event log data by constantly monitoring the size of all NT event logs. When a log reaches a user-defined threshold, it is transferred to a central management system using a secure store and forward mechanism. Tivoli provides configuration facilities and a browser with extensive filtering to allow ad-hoc queries and printing of centrally stored event logs and event correlation. A script will run to extract pertinent information from the logs using Tivoli. This script will be developed by an Operations Manager of the Internet hosting site to provide the ISA with information. The script and the information it provides may be reviewed by appropriate host personnel to ensure that the ISA will have the data necessary to oversee the security of the system. All data from these logs is to be stored for a predetermined period of time. The NSA monitors the TEC and takes appropriate actions for all security related alarms. The NSA and ISA have read access to the event log management server. Again, the ISA approves access to this server.

Referring back to FIG. 2, once the requests get through the firewalls and their intrusion detectors, they are sent to application-level load balancers for distribution to the individual application servers at the Internet hosting site for processing of the requests. For instance, for the group of application servers 290 networked by VLAN 214, the requests are sent to application-level load balancers 295, 296, which may include at least one primary site load-balancer 295 and one backup site load-balancer 296. The load balancers 295, 296 are used to allocate traffic among the application servers and routes traffic based on open connections and processing availability. Furthermore, the requests may be sent to network switches 221, 222 that direct traffic to the application-level load balancers. Additionally, as mentioned earlier, prior to being sent from the network routers to the primary firewalls of Internet hosting sites, the user requests may be sent to firewall load balancers for even distribution to the primary firewalls. Furthermore, geographic load-balancers may be placed on top of the main set of routers to instantaneously redirect IP addresses or domain name system (DNS) entries. Thus, if an Internet hosting site is geographically attacked, such site can be shut down and moved to a new geographic location to avoid the attack, or offending traffic can be redirected to a non-critical location.

Figure 3:
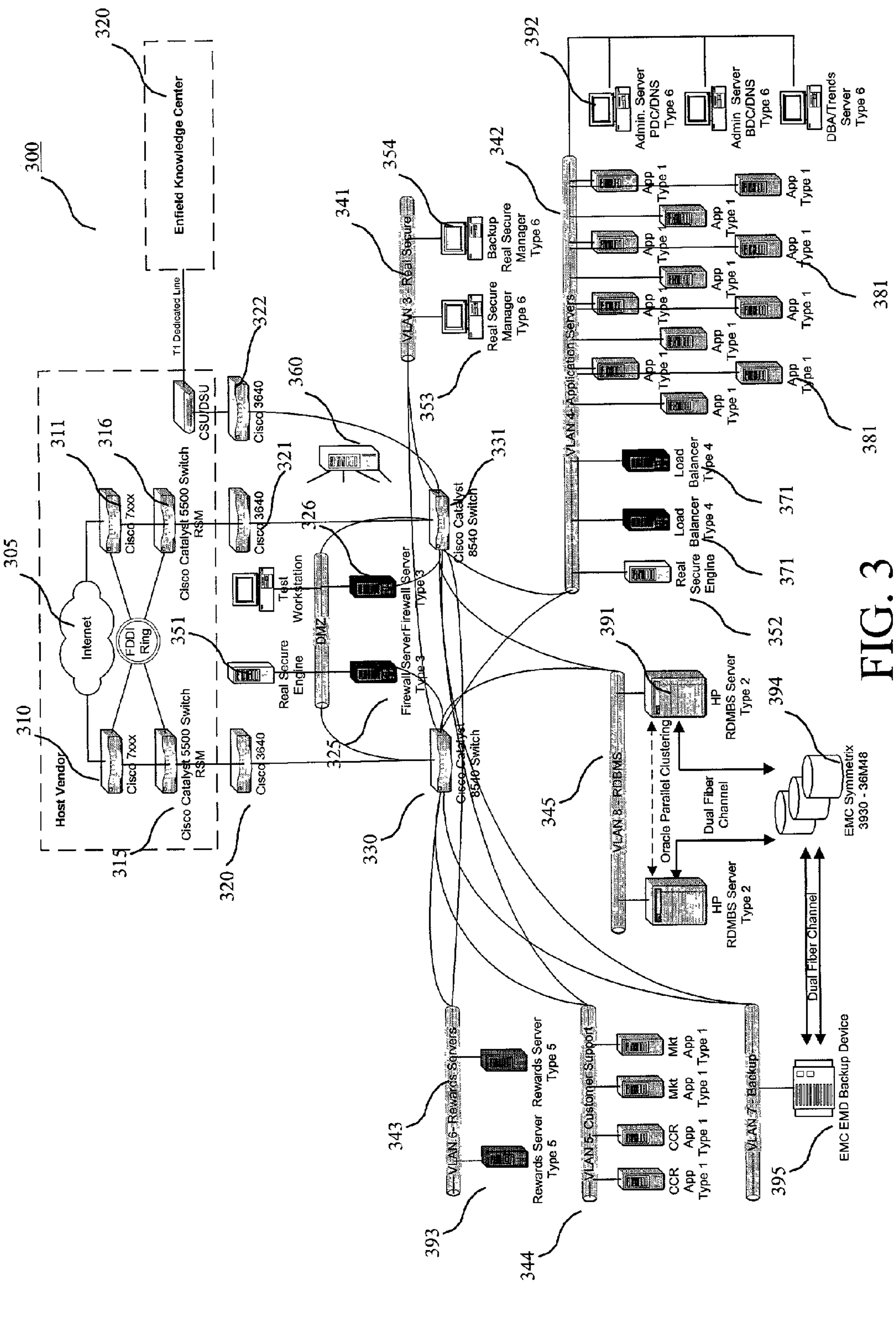
FIG. 3 depicts an implementation of all four levels of Internet hosting security in a host network system in accordance with an embodiment of the present invention.

FIG. 3 shows an implementation of all four levels of Internet hosting security in a host network system 300 of an Internet hosting site. When there is a request from the Internet 305 to access one or more applications residing in the host system 300, routers 310 and 311 are used to receive such traffic and pass it on to the firewall system. The routers 310, 311 may be implemented using CISCO 7200 routers or any other compatible routers. These routers form a first level of security by performing those functions described earlier with regard to routers 110 in FIG. 1. One of the routers, e.g., router 310, is designated the primary router and the other router, e.g., router 311, is designated a secondary router to provide backup and failover capability. Likewise, switches 315 and 316 are respectively designated as primary and secondary/backup. These switches, which may be implemented using CISCO Catalyst 5500 switches, are provided by the host customer service data center 320 so that either inbound access from the customer service data center 320 or inbound access from the Internet 305, via routers 310 or 311, can be directed to the internal switches 330, 331 that service the VLAN segments 341–345.

Internal routers 320 and 321 (one primary and the other secondary/backup) are used to connect the inbound access from the switches 315 and 316 to the internal switches 330 and 331 and to connect inbound access from the Internet 305 to the firewall system 325, 326. As part of the first level of security, the switches 330, 331 provide backup and failover capability to one another and also enable lock down to all inbound traffic by implementing access control lists (ACL's) on the routers' ports. The routers 320 and 321 are multi-function platforms that combine dial access, routing and LAN-to-LAN, services and multi-service integration of voice, video and data. They may be implemented using, for example, CISCO 3640 routers. Additionally, a third internal router 322 with similar functions to routers 320 and 321 may be used to connect the Internet hosting site directly to the host data center site 320 by, for example, an Internet T1 line. The router 322 may have an encryption card installed to secure all transmission to and from the customer service data center site 320. The same hardware is in place on the Internet connection line of the customer service data center side.

Figure 4:
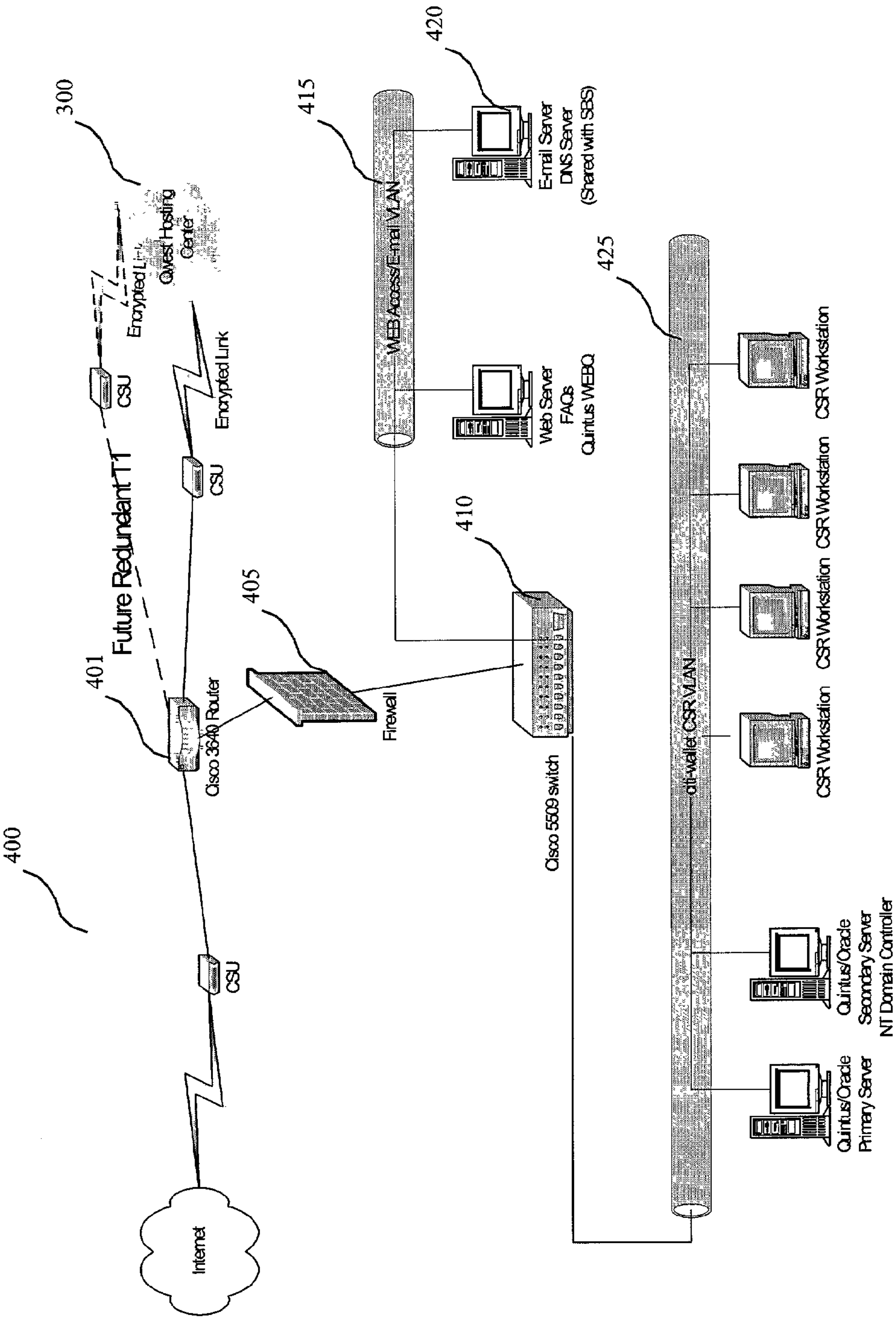
FIG. 4 depicts a Customer Service data center for use with a host network system in accordance with an embodiment of the present invention.

The customer service data center 320 is used to provide help and service to the host customers. FIG. 4 illustrates the customer service data center architecture 400. As mentioned earlier, the customer service data center is connected to the host application system 300 (FIG. 3) via dedicated, encrypted T-1 line. A CISCO 3640 router 401 also provides additional strong encryption connected with the identical router 322 (FIG. 3) at the host application system site 300. In addition, a firewall high availability system 405, identical to the firewall system 325, 326 (FIG. 3) used in the host application system 300, is used to prevent unauthorized addresses, protocols or commands. A CISCO 5509 Catalyst Switch 410 directs traffic from the firewall system 405. At the customer service data center 400, the Web Access/Email VLAN 415 hosts a web server used for FAQ's and Quintus web queries. In addition, an e-mail server 420 handles e-mail traffic between the customer service data center 400 and users and merchants. Customer service representatives (CSRs) have workstations that are connected to the application on the application CSR VLAN 425. The CSRs work off of the Quintus software package to track and resolve customer and merchant incident reports. Quintus runs on a primary HP LH4R NetServer with backup. Oracle is used as the back-end data store.

Referring back to FIG. 3, as explained earlier, the firewalls 325 and 326 are in place to provide protection from unauthorized users. This second level of security and protection is complimentary to that provided by the routers 310, 311 and internal routers 320–322. One of the firewalls 325, 326 is designated the primary firewall and the other one designated a backup or redundant firewall. The redundant firewall machine is connected to a separate VLAN from the rest of the network. Utilizing firewall software, selected based on the host standards, such as Cyberguard HA+ software provides failover real time capabilities. As explained earlier, the firewalls 325, 326 use an intelligent decision-making process to detect and recover firewall gateway failures. When a firewall failure is detected, a transparent process initiates commands that will allow the backup firewall to become the active (primary) Firewall. Fail-over on average will take place in less than a minute without rebooting. "Heartbeat" communication (e.g., Ethernet) interfaces are used to provide dedicated communication between the fail-over firewalls 325, 326. IP addresses are migrated across these firewalls when a failure occurs so the IP will not change to the outside world.

For network monitoring at the second level of security, an intrusion detection scheme is used to intelligently monitor and defend against possible intrusion. This scheme may be implemented using an automated intrusion, detection and response system, i.e., intrusion detection system (IDS), that additional guards against internal abuse, such as the Real Secure system or equivalents thereof. The purpose of an IDS is to inform security administrators in real-time of any malicious activity on their networks. Malicious activity is one that may lead to the unauthorized loss, manipulation, or transfer of data. It may also lead to the loss of system availability due to a denial of service attack. The Real Secure IDS used in the present invention comprises three components: Real Secure network engines, system agents, and Real Secure management console.

The Real Secure network engines 351, 352 perform the real-time network monitoring and attack recognition for the critical segments in a network. The monitoring network interface of an engine is placed in promiscuous mode which enables it to see all network traffic. These engines run on a dedicated host and monitor network traffic for attack signatures and alert personnel when an attack is detected. The engine 351/352 looks for a select combination of packets that matches any profile of comprehensive list of well-known attacks. An operator (e.g., ISA or NSA) can also define any network connection to be a suspicious event, triggering an alarm to the console, or a harmless event, one that is filtered and ignored by the IDS. The Real Secure Engines 351, 352 are arranged in a "book-end" manner, one in front of and one behind the firewall system 325,326. The engine 352 on the inside segment of the firewall system 351, 352 complements the engine 351 on the outside. The inside engine 352 detects any malicious activity that has penetrated through the firewall and is now on the inside of the Internet hosting site. Because the inside segment of the firewall system 325, 326 support all of the application servers 381, the engine 352 is further justified. This engine also detects any suspicious activity originating from the internal network.

A central management console 353 performs management of all network engines. The management console 353 may run on various different platforms (e.g., NT platform). The management console 353 does not require a dedicated machine, but it is preferable to provide one. There is no limit to the number of engines 351, 352 managed by one console 353. On the other hand, there can exist multiple management consoles 353, but only one can be the master console for a given engine 351/352 at any one time. All alarms, events, and logs are sent to the management console for display or further analysis. The management console 353 controls the engines 351, 352 by issuing start, stop, or pause commands. It also reconfigures attack signatures, filters, and event responses as well as exchange keep alive messages. Real-time alarms are displayed in one of three windows: High, Medium, or Low Priority. All current events are displayed in an Activity Tree, which can be navigated to show all of the details about the event using the Event Inspector. For historical reference, a database holds all logged records of events and can be queried to generate text and graphical reports. Standard and customized reports are both available. Logs are stored in an ODBC compliant database, which make it very easy to import them into various other vendor databases. The database usually resides on the management console but this is not a restriction. A Real Secure Agent analyzes host logs to determine whether an attack was successful. Each of these components reports to the Real Secure management console 353 in the local VLAN 341, which also includes a backup Real Secure management console 354 for redundant and failover services.

The third level of security for the host application system 300, as explained earlier, is maintained by enforcing ACLs maintained by the aggregate switches 330, 331 for the internal VLANs 341–345. The internal routing in the aggregate switches 330, 331 will block unwanted traffic to a particular VLAN based on the VLAN's port, IP address, or both. The internal switches 330 and 331 are used to connect the internal routers 320–322 with all of the internal VLAN segments 341–345. Each of the switches 330 and 331 enables high speed switching and segmentation between the various components in the host application system 300. Again, there are at least two of these devices in the host application system 300 to provide redundant services. The internal server connections are split between the switches 330 and 331 to allow for maximum equipment availability. Each switch has definitions for all VLANs 341–345 and can provide appropriate service should either switch fail. The internal switches 330 and 331 may be implemented using CISCO Catalyst 8540 switches or equivalents thereof, and they function like those switches 221, 222 in FIG. 2.

The fourth level of security is provided by an event log management system 360 such as the March EventLog Manager or equivalents thereof. The March EventLog Manager ensures the continuity of event log data by constantly monitoring the size of all event logs in the host application system 300. As mentioned earlier, when a log reaches a user-defined threshold it is transferred to a central management system using a secure store and forward mechanism. The EventLog Manager provides configuration facilities and a browser with extensive filtering to allow adhoc queries and printing of centrally stored event logs. It is used to roll up and monitor all event logs in the data center. This allows the ISA to identify any security issue or other areas of concern that may arise. According to an embodiment of the present invention, the EventLog Manager 360 runs on a dedicated server, such as a Windows NT server, to roll up all event logs and an Agent will reside on all machines that need their event logs monitored.

The rest of the host application system 300 is now explained. Once the access requests get through the firewalls 325, 326 and their intrusion detectors 351, 352, they are sent to application-level load balancers 371 for distribution to the individual application servers 381 for processing of the access requests. As mentioned earlier, the load balancing servers 371, one primary scheduler and one backup scheduler, provide load balancing and failover services for the plurality of application servers 381 in order to distribute processing and maintain optimum application performance. One example of the implementation of the site load balancers 371 is the use of a load balancing software, NT Resonate Central Dispatch Scheduler, running on a dedicated Hewlett-Packard LH4R server in front of the application servers 381. Alternatively, the load balancers 371 may comprise multiple pairs of F5's high availability BigIP. BigIP is used to allocate traffic among the application servers 381 and routes traffic based on open connections and processing availability. F5's 3DNS product may also be used to host DNS records for application that are load balanced between the production facilities.

According to an embodiment of the present invention, the application servers 381 run a particular host application in a web "server farm" configuration. Each server is identical and the load balancers 371 distribute process to each server 371 based first on open connections and then CPU utilization. Two workstations 392 are used to monitor the performance and availability of the application in the application servers 392. For the VLAN 345, two database servers 391 and 392 run Oracle with the Parallel Server option for high availability and load balancing. This serves as the relational database management system for the application residing in the application servers 381, storing customer and transaction data. The EMC disk array 394 provides all data storage needed for the application in the application servers 381. A backup device 395 is used to generate automated tape backups of the system. At the VLAN 343, two rewards servers 393 store and forward rewards transactions related to the applications in application servers 381 to a clearinghouse. One rewards server. operates as the primary and the other as a backup. It should be noted that the servers 393 can be for any applications supporting the application in application servers 381.

According to another embodiment of the present invention, there are additional internal intrusion detectors to screen the user requests once the application level load balancers 371 have distributed them. This is done to further deter any electronic attacks that may have penetrated the upper layers of the network security infrastructure. Once an attack is detected at this lower level, port level filtering or processes of such nature may be done to further secure the particular Internet hosting site, so that only certain protocols and TCP/IP ports are actually opened and authenticated. The ports can be authenticated on an inbound and outbound basis, and each application hosted at an Internet hosting site is segregated within this environment.

Explanation is now made regarding to the Change Control processes mentioned earlier in reference to a change in the ACLs of the routers 110 of FIG. 1 or routers 310, 311 of FIG. 3. Although a change in a router's ACL is directed to a software change, the Change Control processes described below is applicable to both hardware and software changes.

Figure 5:
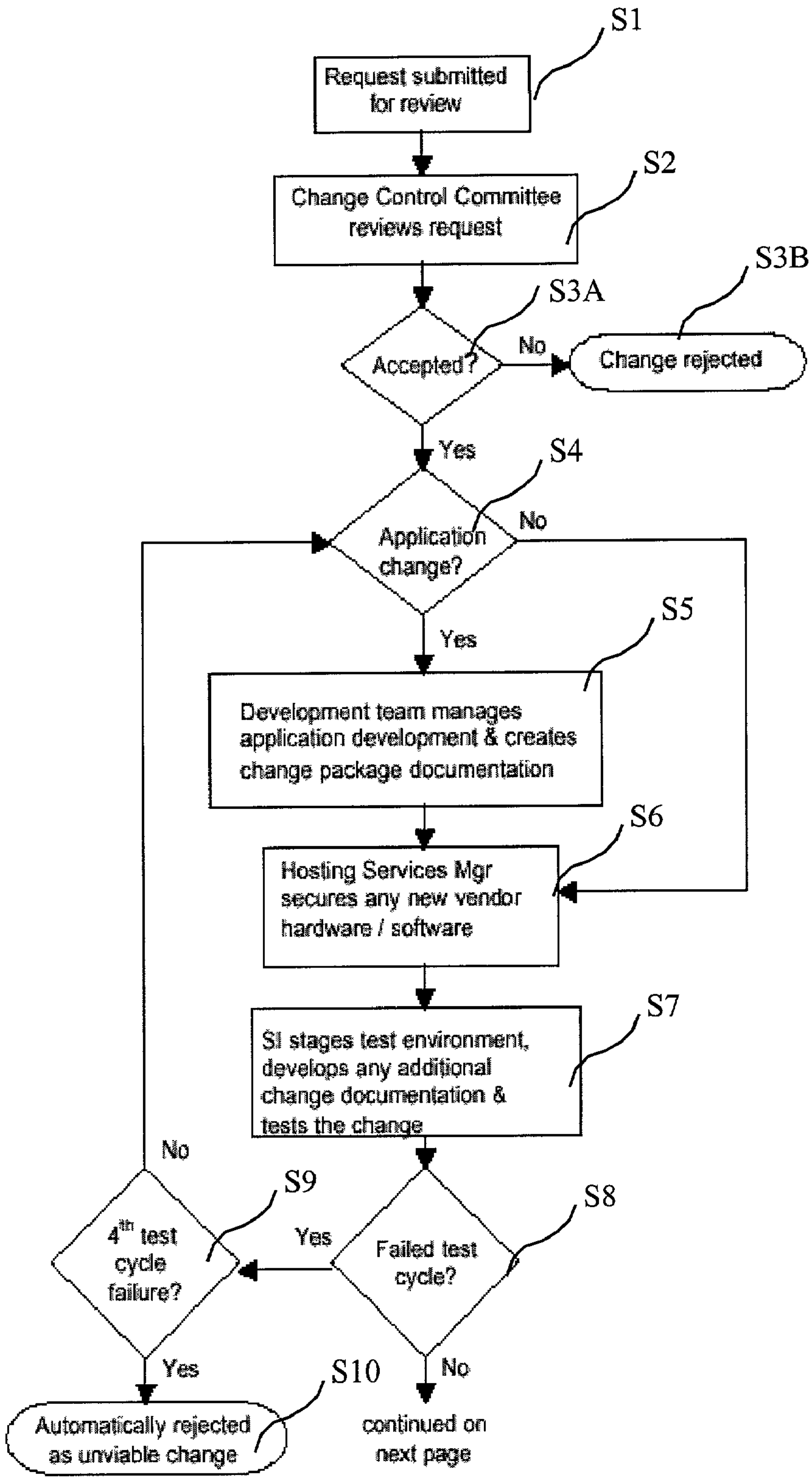
FIGS. 5 and 6 depict the Change Control processes for hardware and/or software change in a host network system in accordance with an embodiment of the present invention.
Figure 6:
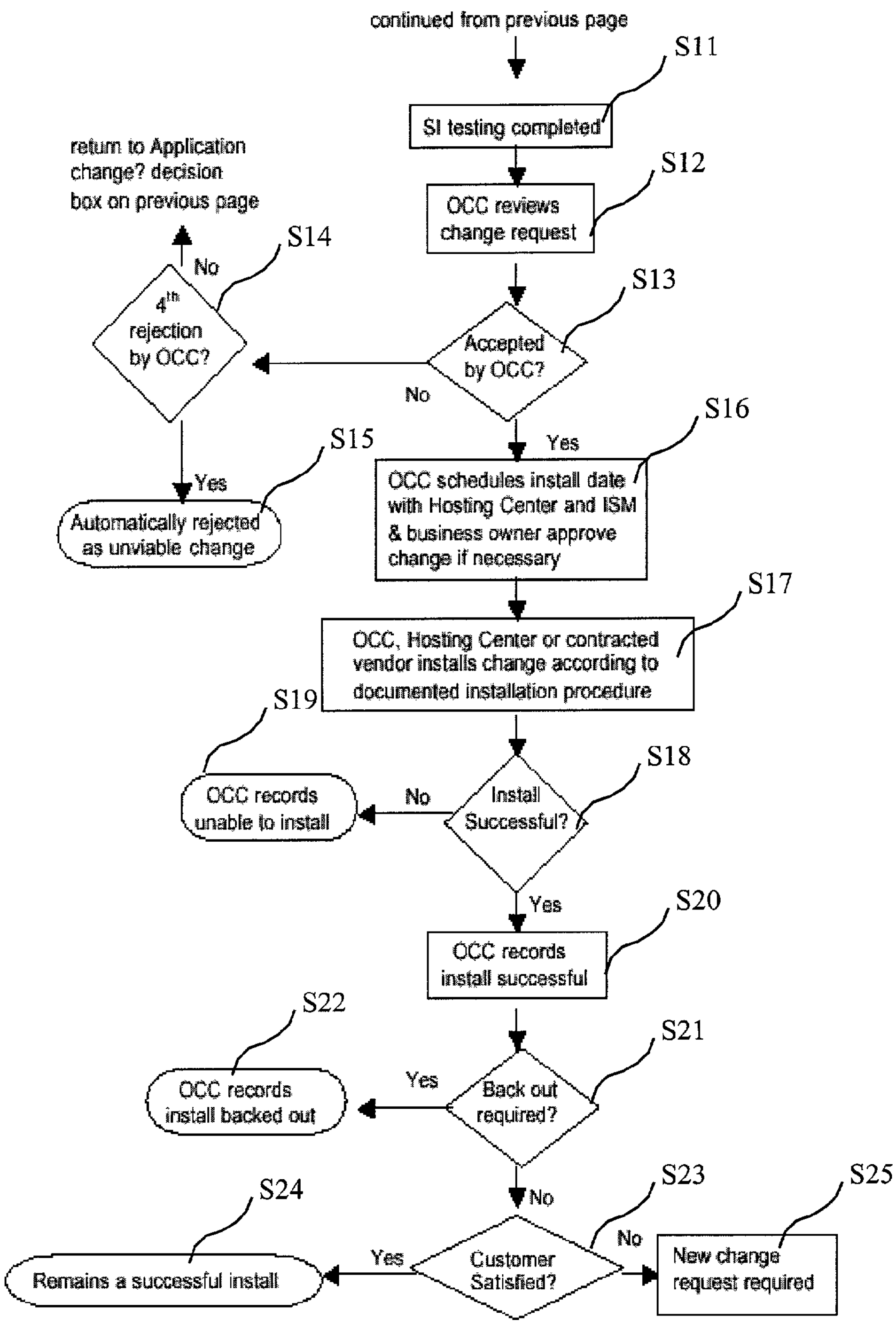

FIGS. 5 and 6 show a flowchart of a change request lifecycle. At S1, a request for change is submitted for review to the Change Control Committee (CCC), which may be made up of representatives from the various host departments and/or the host customers. At S2, the request is reviewed by the CCC and it is either rejected at S3B or accepted at S3A and sent on to either the appropriate application development team at S5 or the System Integration unit (SI) at S6, depending upon the type of change being requested. At S5, the application development team develops any necessary application software required for deployment of the change, creates the necessary documentation required for test and deployment then forwards the request to SI for testing. At S6, the hosting services group manager may secure any new vendor hardware and/or software required for test and deployment of the change based upon the documentation prepared by the application development team. At S7, the SI stages the testing environment, develops any additional documentation that is required, performs system and user acceptance testing against the change and, upon satisfactory completion, forwards the request to an Operations Control Center (OCC) for deployment in production or host application system 300 (FIG. 3). At S8, a request that fails an SI test cycle can be returned to the application development team by the SI for rework. The SI may return a request to the development team a maximum of predetermined number of times. At S9, upon the predetermined number of failures, the request is automatically considered an unviable change and rejected and its progress is permanently halted at S10.

In FIG. 6, the SI testing is completed at S11. At S12, the OCC reviews the request and at S13 either accepts it for production deployment or returns it to the application development team or SI due to inadequate preparation. A request may be returned to the application development team/SI by the OCC a maximum predetermined number of times. At S14, upon the predetermined number of returns, it is automatically considered an unviable change and rejected and its progress permanently halted. Once the change has been accepted by the OCC, deployment of the change requires approval of a host business department or division and/or it customers if change deployment requires an interruption in customer service. The deployment of change also requires approval of the ISA if change deployment affects service/data security. At S16, the OCC then coordinates the deployment date for each install location with the applicable hosting center. At S17, the installation of the approved change is performed by the OCC, or a contracted vendor, if the change is to a component inside the front and back-end firewalls of the host application system. This includes changes to the firewalls themselves. Alternatively, the installation of the approved change is performed by the hosting center, or a contracted vendor, if the change is to a network backbone component beyond the front-end firewall of the host application system.

At S18, deployment is recorded by the OCC to determine if the change has been successfully or unsuccessfully installed. If the change is successfully installed, but later must be backed out for whatever reason at S21, de-installation is performed by the same group that performed the installation and the fact that the change had to be backed out is also recorded by the OCC at S22. If the deployed change is application-related, the host department or division and/or its customers can access the application and acknowledge whether the deployment satisfied the intended reason for the change at S23. If it did not, a new change requested can be submitted at S25. Otherwise, the deployment of change remains a successful install at S24.

Although the invention has been described with reference to these preferred embodiments, other embodiments could be made by those in the art to achieve the same or similar results. Variations and modifications of the present invention will be apparent to one skilled in the art based on this disclosure, and the present invention encompasses all such modifications and equivalents.

What is claimed is:

1. A system for providing an electronically secured web site of a private network on the Internet, comprising:

means for routing an external access request from the Internet to the web site and for limiting the external access request to the web site based on a type of the external access;

means for providing an electronic wall between the Internet and the private network of the web site, for receiving the routed external access request from the means for routing and limiting, and for rejecting or passing the routed external access request;

means for detecting the routed external access request and for determining whether the routed external access request is an attack on the private network of the web site;

means for controlling a routing of the routed external access request within the private network to a particular area of the private network based on a location address of the particular area; and means for recording the routing of the routed external access request within the private network.

2. The system of claim 1, wherein the means for detecting the routed external access request detects the routed external access request at the means for providing the electric wall.

3. The system of claim 2, wherein the means for detecting and determining comprises first means for detecting the routed external access request prior to its receipt at the means for providing the electronic wall and second means for detecting the routed external access request after it is received and passed by the means for providing the electronic wall.

4. The system of claim 1, wherein the means for recording also provide recording of all events happening in the system.

5. The system of claim 1, wherein the means for recording also provide recording of the routing of the external access request by the means for routing and the receiving of the routed external access request at the means for providing an electronic wall.

6. The system of claim 1, wherein the means for routing the external access request comprises:

primary means for routing the external access request; and secondary means as backup for the primary means for routing external access request when the primary means for routing becomes unavailable.

7. The system of claim 1, wherein the means for providing the electronic wall comprises:

primary means for providing the electronic wall; and secondary means for providing the electronic wall when the primary means for providing the electronic wall becomes unavailable.

8. A system for providing security to a plurality of hosting sites on the Internet comprising:

a first level of security that provides a first screening of requests from the Internet for access to the plurality of Internet hosting sites;

a second level of security that detects and prevents unauthorized access to the plurality of Internet hosting sites by the access requests that are screened and passed by the first level of security;

a third level of security that provides a second screening of the access requests that are authorized by the second level of security; and a fourth level of security that provides recording of all events happening in the plurality of Internet hosting sites.

9. The system of claim 8, wherein the first level of security comprises a plurality of routers that screen the access requests based on a type of each of the access requests and route the passed access requests to the second level of security.

10. The system of claim 8, wherein the second level of security comprises a plurality of firewall systems, each associated with a corresponding one of the Internet hosting sites.

11. The system of claim 10, further comprising at least one load balancer for load balancing the passed access requests from the first level of security across the plurality of firewall systems.

12. The system of claim 10, wherein the second level of security further comprises an intrusion detection system (IDS) for detecting unauthorized entry of one of the passed access requests into at least one of the plurality of firewall systems; wherein the intrusion detection system comprises a first intrusion detection engine arranged in front of the at least one firewall system and a second intrusion detection engine arranged behind the at least one firewall system.

13. The system of claim 10, wherein the second level of security further comprises a plurality of IDS's, each associated with a corresponding one of the plurality of firewall systems for detecting and preventing unauthorized entry of any one of the passed access requests into any one of the plurality of firewall systems.

14. The system of claim 8, wherein the third level of security comprises switches that manage sub-networks within a network for each of the Internet hosting sites.

15. The system of claim 14, wherein the switches maintain lists of addresses of the sub-networks and provide the second screening of the access requests authorized by the second level of security based on the lists of addresses.

16. The system of claim 8, wherein the third level of security comprises at least one switch for a corresponding one of the Internet hosting sites, wherein the at least one switch manages a plurality of sub-networks within a network of the corresponding Internet hosting site.

17. The system of claim 16, wherein the at least one switch maintains addresses of the sub-networks of the corresponding hosting site and provides the second screening based on the address list of any one the access requests authorized by the second level of security and routed to the corresponding hosting site.

18. The system of claim 17, wherein the at least one switch comprises a two duplicate switches with a primary switch and a secondary switch, wherein the secondary switch provides backup to the primary switch.

19. The method of claim 8, wherein the fourth level of security comprises an at least one event log manager maintained in a server that connects throughout a network of at least one of the plurality of Internet hosting sites and records all events happening to the at least one Internet hosting site.

* * * * *